(12) United States Patent
Fox et al.

(10) Patent No.: US 6,651,931 B1
(45) Date of Patent: Nov. 25, 2003

(54) MULTI-POSITIONAL LANDING GEAR ASSEMBLIES

(75) Inventors: Stephen J. Fox, Everett, WA (US); Mark N. Simpson, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/236,748

(22) Filed: Sep. 4, 2002

(51) Int. Cl.$^7$ ............................................. B64C 25/10
(52) U.S. Cl. .................................................. 244/104 R
(58) Field of Search ........................ 244/100 R, 102 R, 244/117 R, 102 A, 102 SS

(56) References Cited

U.S. PATENT DOCUMENTS

| | | | | |
|---|---|---|---|---|
| 2,690,887 A | * | 10/1954 | Perdue ................... | 244/102 R |
| 2,939,655 A | * | 6/1960 | Hartel .................... | 244/102 R |
| 2,967,033 A | * | 1/1961 | Langdon ................ | 244/102 R |
| 4,720,063 A | * | 1/1988 | James et al. ........... | 244/102 R |
| 5,022,609 A | * | 6/1991 | Cranston ................ | 244/102 R |
| 5,100,083 A | * | 3/1992 | Large et al. ........... | 244/102 SS |
| 5,692,703 A | * | 12/1997 | Murphy et al. ......... | 244/102 R |
| 6,070,831 A | * | 6/2000 | Vassiliev et al. ......... | 244/120 |

FOREIGN PATENT DOCUMENTS

| | | | | |
|---|---|---|---|---|
| EP | 00451910 A1 | * | 10/1991 | ............. 244/102 R |
| EP | 0564772 A1 | * | 10/1993 | ............. 244/102 R |

* cited by examiner

*Primary Examiner*—Michael J. Carone
*Assistant Examiner*—Daniel Matz
(74) *Attorney, Agent, or Firm*—Perkins Coie LLP

(57) ABSTRACT

Aircraft landing gear assemblies having multiple deployed static positions. In one embodiment, a landing gear assembly usable with a wing includes a wheel truck and a strut having a first strut end and a second strut end. The first strut end is configured to be pivotally connected to the wing, and the second strut end is configured to be pivotally connected to the wheel truck. In one aspect of this embodiment, the strut is configured to be connected to a first brace extending between the strut and the wing for positioning the wheel truck in a first deployed static position. In another aspect of this embodiment, the strut is further configured to be connected to a second brace extending between the strut and the wing for positioning the wheel truck in a second deployed static position different than the first deployed static position.

68 Claims, 5 Drawing Sheets

MULTI-POSITIONAL LANDING GEAR ASSEMBLIES

TECHNICAL FIELD

The following disclosure relates generally to aircraft landing gear assemblies and, more particularly, to aircraft landing gear assemblies having multiple deployed static positions for accommodating different aircraft configurations.

BACKGROUND

Conventional land-based aircraft generally have some form of landing gear for taking off and landing. On many aircraft, the landing gears are retractable after taking off to reduce drag during flight. The tricycle configuration is a typical landing gear configuration that includes a steerable nose landing gear assembly ("nose gear") and two main landing gear assemblies ("main gears"). The nose gear is positioned under a forward portion of the fuselage and each of the main gears is positioned under a wing. To ensure stability when on the ground, the nose gear is typically positioned forward of the center of gravity ("CG") of the aircraft, and the main gears are typically positioned aft of the CG. In addition, because the main gears are generally configured to carry most of the ground loads, the main gears are typically positioned closer to the CG than the nose gear.

Changes to the structural configuration of an aircraft may require a reevaluation of the landing gear positions relative to the CG. For example, an aircraft manufacturer will often stretch the fuselage of a particular aircraft configuration to increase its passenger capacity. On a conventional aircraft configuration, the wings are mounted to a mid-portion of the fuselage, and the fuselage can be extended both fore and aft of the CG so that the CG does not move appreciably. In this situation, the main gears may not have to be repositioned to maintain the desired weight distribution between the nose gear and the main gears. Thus, by maintaining the CG position, an aircraft manufacturer is able to use the same wing and main gear configuration for both baseline and stretch versions of an aircraft. This is a significant benefit because the costs associated with designing and manufacturing multiple wing and main gear configurations can be substantial.

However, on some aircraft configurations, such as those having the wing mounted to an aft-portion of the fuselage, the fuselage must be extended forward of the wing to add passenger capacity. This tends to move the CG of the aircraft forward. To maintain the desired weight distribution between the nose gear and the main gears in this situation, the main gears should also move forward. Repositioning of the main gears in this manner can require a major redesign of the wing structure that supports the main gears, as well as a repositioning of the wheel wells that receive the main gears in their retracted positions.

SUMMARY

The present invention is directed to aircraft landing gear assemblies, such as aircraft landing gear assemblies having multiple deployed static positions for use with different aircraft configurations having common or at least generally similar wing configurations. In one embodiment, a landing gear assembly usable with a wing includes a wheel truck and a strut configured to be pivotally connected between the wing and the wheel truck. In one aspect of this embodiment, the strut is configured to be connected to a first brace extending between the strut and the wing to position the wheel truck in a first deployed static position relative to the wing. In another aspect of this embodiment, the strut is further configured to be connected to a second brace extending between the strut and the wing to position the wheel truck in a second deployed static position relative to the wing different than the first deployed static position.

In another embodiment, the strut is configured to be pivotally connected to the first and second braces, the first and second braces being foldable drag braces. In one aspect of this embodiment, the first and second braces are interchangeably connectable to the strut at the same location on the main strut.

In a further aspect of this embodiment, the first and second braces are interchangeably connectable to the wing at the same location on the wing.

In a further embodiment, a method for manufacturing a second aircraft configuration derived from a first aircraft configuration is provided. In one aspect of this embodiment, the first aircraft configuration has a first CG location and the second aircraft configuration has a second CG location different than the first CG location. The first aircraft configuration can further have a first wing and a first landing gear assembly. The first wing can include a first pivot location and the first landing gear assembly can be pivotally connected to the first wing at the first pivot location. The first landing gear assembly can be configured to position a first wheel truck in a first deployed static position to support a portion of the weight of the first aircraft configuration.

In another aspect of this embodiment, the method for manufacturing the second aircraft includes providing a second wing, the second wing being at least generally similar to the first wing and having a second pivot location. The method can further include providing a second landing gear assembly, the second landing gear assembly configured to position a second wheel truck in a second deployed static position to support a portion of the weight of the second aircraft configuration. In a further aspect of this embodiment, the second deployed static position of the second wheel truck is different than the first deployed static position of the first wheel truck. The method can additionally include pivotally connecting the second landing gear assembly to the second wing at the second pivot location.

DETAILED DESCRIPTION

Figure 1:
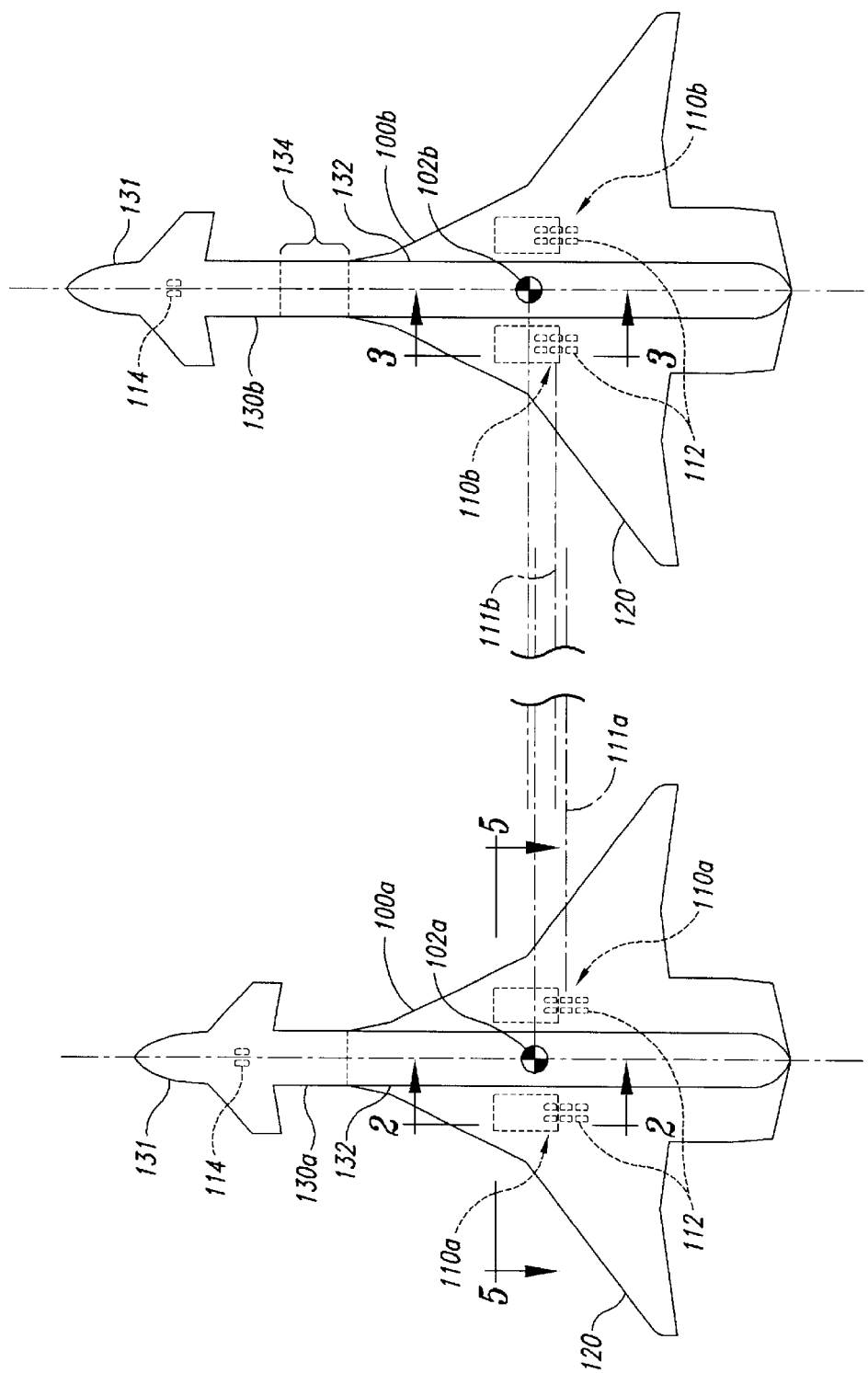
FIG. 1A is a partially hidden top plan view of a baseline aircraft having first main gear assemblies in a first deployed static position, in accordance with an embodiment of the invention.
FIG. 1B is a partially hidden top plan view of a stretch aircraft having second main gear assemblies in a second deployed static position, in accordance with an embodiment of the invention.

The following disclosure describes aircraft landing gear assemblies, such as aircraft landing gear assemblies that can be interchangeably configured for use with multiple aircraft configurations. Certain specific details are set forth in the following description and in FIGS. 1A–8 to provide a thorough understanding of various embodiments of the invention. Those of ordinary skill in the relevant art will understand, however, that the invention may have additional embodiments that may be practiced without several of the details described below. In addition, well-known structures and systems often associated with aircraft and aircraft landing gear assemblies have not been shown or described in detail here to avoid unnecessarily obscuring the description of the various embodiments of the invention.

In the drawings, identical reference numbers identify identical or generally similar elements. To facilitate the discussion of any particular element, the most significant digit or digits in any reference number refers to the figure in which that element is first introduced. For example, element 240 is first introduced and discussed in reference to FIG. 2. In addition, any dimensions, angles and other specifications shown in the figures are merely illustrative of particular embodiments of the invention. Accordingly, other embodiments of the invention can have other dimensions, angles and specifications without departing from the spirit or scope of the present invention.

FIG. 1A is a partially hidden top plan view of a baseline or first aircraft 100a having first main gear assemblies 110a in first deployed static positions 111a, in accordance with an embodiment of the invention. FIG. 1B is a partially hidden top plan view of a stretch or second aircraft 100b having second main gear assemblies 110b in second deployed static positions 111b, in accordance with an embodiment of the invention. As used herein, the term deployed static position refers generally to a position in which the gear assembly is releasably fixedly positioned relative to the aircraft 100a and oriented to support at least a portion of the aircraft weight. Referring first to FIG. 1A, in one aspect of this embodiment, the first aircraft 100a includes a wing 120 and a first fuselage 130a. The first fuselage 130a can include a forward fuselage portion 131 and an aft fuselage portion 132. The wing 120 can be fixedly attached to the aft fuselage portion 132, and a steerable nose gear assembly 114 can extend downwardly from the underside of the forward fuselage portion 131 forward of a first CG 102a. In another aspect of this embodiment, the first main gear assemblies 110a extend from the underside of the wing 120 on either side of the aft fuselage portion 132 aft of the first CG 102a. Each of the first main gear assemblies 110a can include a wheel truck 112 having a plurality of wheels for landing. In a further aspect of this embodiment, the wheel trucks 112 are positioned in the first deployed static position 111a relative to the wing 120 to provide a favorable weight distribution between the nose gear assembly 114 and the first main gear assemblies 110a.

Referring now to FIG. 1B, in one aspect of this embodiment, the second aircraft 100b shares many common components with the first aircraft 100a, including the wing 120, the forward fuselage portion 131, the aft fuselage portion 132, the steerable nose gear assembly 114, and the wheel trucks 112. In another aspect of this embodiment, however, the second aircraft 100b further includes a fuselage extension 134 connected to the forward and aft fuselage portions 131 and 132 to increase the passenger and/or cargo capacity of a second fuselage 130b. The addition of the fuselage extension 134 can give the second aircraft 100b a second CG 102b forward of the first CG 102a of the first aircraft 100a. To maintain the favorable weight distribution between the nose gear assembly 114 and the second main gear assemblies 110b on the second aircraft 100b, the wheel trucks 112 can be positioned in a second deployed static position 111b forward of the first deployed static position 111a of the first aircraft 100a.

As will be described in greater detail below, in one aspect of the invention, the first and second main gear assemblies 110a and 110b are at least generally similar to each other and can be selectively configured to position the wheel trucks 112 within a range of fore and aft deployed static positions. By selecting the appropriate deployed static position of the wheel trucks 112, the main gear assemblies 110a and 110b can accommodate a range of aircraft CG positions without requiring modification to the associated structures of the wing 120. This allows the same configuration of the wing 120 to be used with multiple fuselage configurations without costly redesigns.

Figure 2:
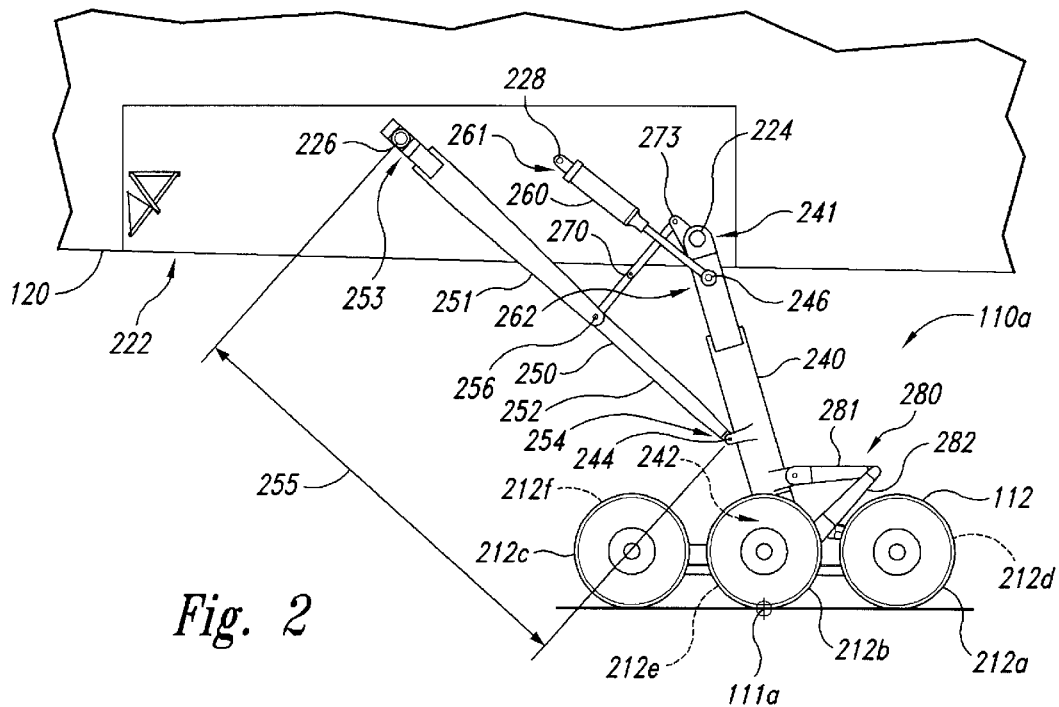
FIG. 2 is a side elevational view of one of the first main gear assemblies of FIG. 1A in accordance with an embodiment of the invention taken substantially along line 2—2 in FIG. 1A.

FIG. 2 is a side elevational view of one of the first main gear assemblies 110a in accordance with an embodiment of the invention taken substantially along line 2—2 in FIG. 1A. In one aspect of this embodiment, the first main gear assembly 110a (the "first gear 110a") includes a main strut 240 and a first brace 250. The main strut 240 can include a first strut end 241 configured to be pivotally connected to the wing 120 at a trunnions or first location 224, and a second strut end 242 configured to be pivotally connected to the wheel truck 112. In another aspect of this embodiment, the main strut 240 can be a uniaxial member, such as a telescoping, shock-absorbing member that carries the main aircraft loads during takeoff and landing. In other embodiments, the main strut 240 can be other types of structural members. In a further aspect of this embodiment, a torsion link assembly 280 extends between the main strut 240 and the wheel truck 112 proximate to the second strut end 242. As will be explained in greater detail below, the torsion link assembly 280 can include a first link 281 and a second link 282 configured to pivot the wheel truck 112 about the second strut end 242 as the main strut 240 pivots forwardly and upwardly about the first location 224, retracting the wheel truck 112 into a wheel well 222. In another aspect of this embodiment, the wheel truck 112 includes six wheels 212a–f. In other embodiments, the wheel truck 112 can include more or fewer wheels depending on factors such as aircraft weight and landing conditions.

In one aspect of this embodiment, the first brace 250 includes a first part 251 foldably connected to a second part 252 at a hinge point 256. The first part 251 can include a first brace end 253 configured to be pivotally connected to the wing 120 at a second location 226. The second part 252 can include a second brace end 254 configured to be pivotally connected to the main strut 240 at a third location 244. When fully extended, the first brace 250 defines a first brace length 255 between the second location 226 on the wing 120 and the third location 244 on the main strut 240. In another aspect of this embodiment, the first brace length 255 controls the deployed position of the wheel truck 112. Accordingly, as will be explained in greater detail below, the deployed static position 111a of the wheel truck 112 can be changed by replacing the first brace 250 with a different brace having a brace length different than the first brace length 255.

In one aspect of this embodiment, the first gear 110a further includes a folding linkage 270 and an actuator 260. The actuator 260 can be a hydraulic cylinder, including a first actuator end 261 configured to be pivotally connected to the wing 120 at a fourth location 228, and a second actuator end 262 configured to be pivotally connected to the main strut 240 at a fifth location 246. In another aspect of this embodiment, the folding linkage 270 extends from a stanchion 273 positioned at least proximate to the first location 224 to the hinge point 256 on the first brace 250. When extended, the folding linkage 270 can lock the first brace 250 in the extended position as shown in FIG. 2. When a mechanism (not shown) causes the folding linkage 270 to start folding, the folding linkage 270 can cause the first brace 250 to start folding at about the hinge point 256. The actuator 260 can then retract, pulling the first gear 110a forwardly and upwardly into the wheel well 222.

Figure 3:
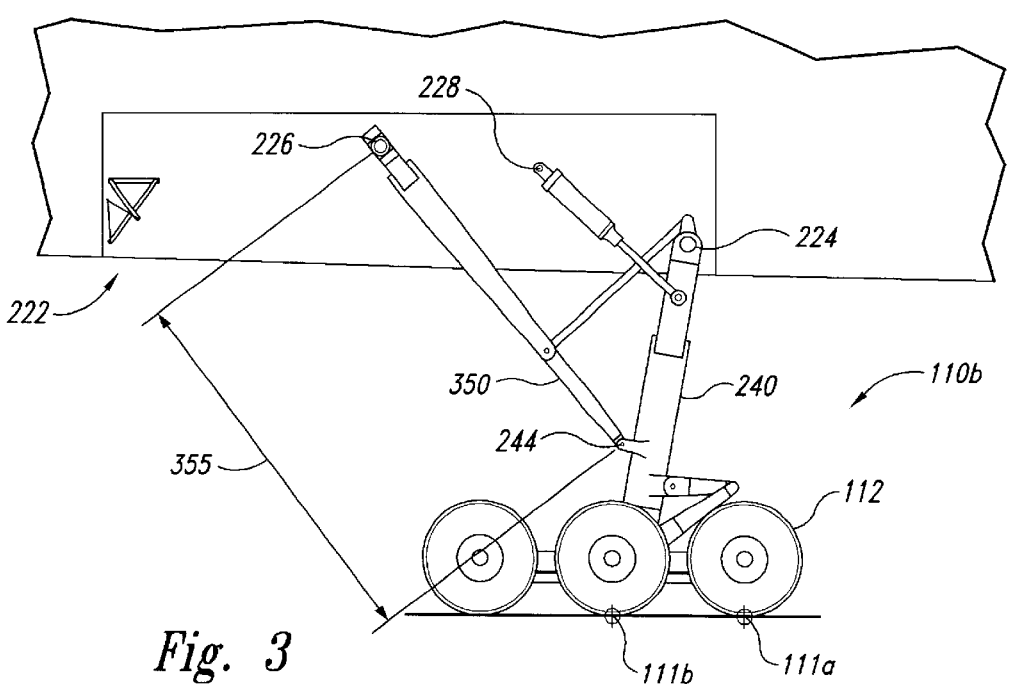
FIG. 3 is a side elevational view of one of the second main gear assemblies of FIG. 1B in accordance with an embodiment of the invention taken substantially along line 3—3 in FIG. 1B.

FIG. 3 is a side elevational view of one of the second main gear assemblies 110b, in accordance with an embodiment of the invention taken substantially along line 3—3 in FIG. 1B. In one aspect of this embodiment, the second main gear assembly 110b (the "second gear 110b") shares many common components with the first gear 110a described above with reference to FIGS. 1A and 2, including the main strut 240 and the wheel truck 112. In addition, the related wing structures, including the wheel well 222, the first location 224, the second location 226, and the fourth location 228, remain unchanged for both main gear configurations. In another aspect of this embodiment, however, the second gear 110b includes a second folding drag brace or a second brace 350 connected between the second location 226 on the wing 120 and the third location 244 on the main strut 240 in place of the first brace 250 (FIG. 2). When fully extended, the second brace 350 can define a second brace length 355 between the second location 226 and the third location 244 different than the first brace length 255 (FIG. 2). For example, in the illustrated embodiment, the second brace length 355 can be less than the first brace length 255, moving the second deployed static position 111b forward of the first deployed static position 111a. Accordingly, by changing the brace length in the foregoing manner, the common components of the first and second gears 110a and 110b (including the main strut 240 and the wheel truck 112) and the related wing structures (including the wheel well 222, the first location 224, the second location 226, and the fourth location 228) can be used for a number of different aircraft configurations having different CG locations.

The method described above with reference to FIGS. 1A–3 for changing the brace length 255, 355 by interchanging braces 250, 350 is but one possible method in accordance with the present invention. In other embodiments, the brace length, and hence the corresponding deployed static position, can be changed using different methods. For example, in another embodiment, the brace length can be changed by changing the length of a single brace that is adjustable or otherwise configurable to two or more different lengths. In a further embodiment, the deployed static position can be changed using a single brace by changing the point or points at which the brace is connected to one or both of the wing 120 or the main strut 240 to change the "effective"brace length. In still other embodiments, other methods and structures can be used to change the deployed static positions of landing gear assemblies without departing from the spirit or scope of the present invention.

Figure 4:
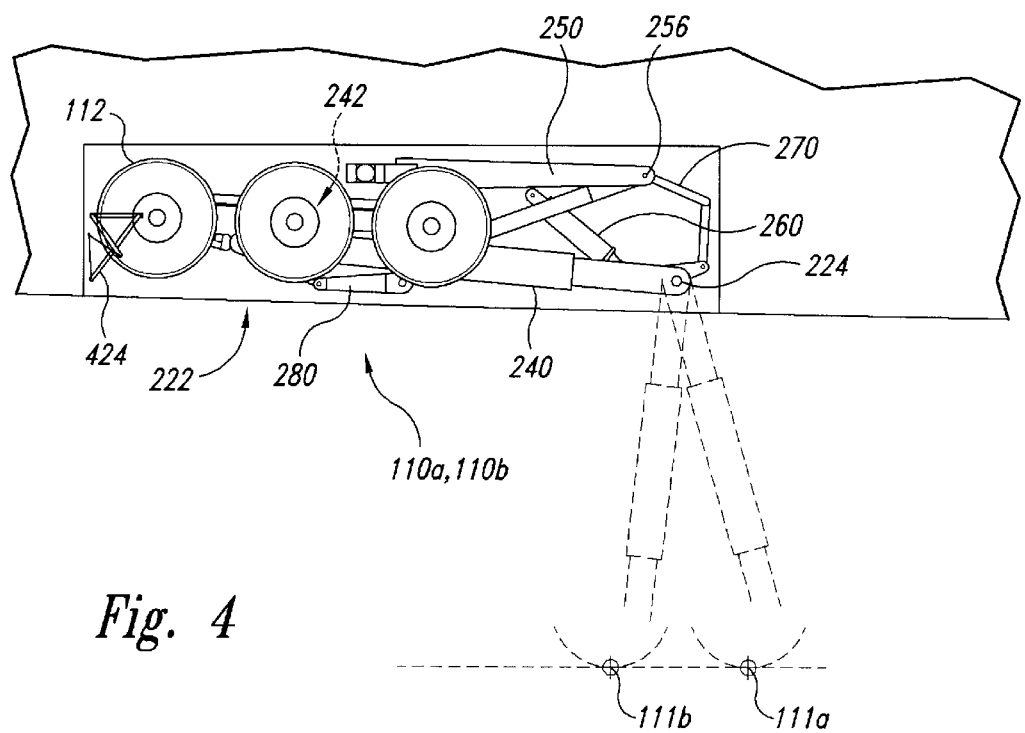
FIG. 4 is a side elevational view of one of the first main gear assemblies of FIG. 1A in a retracted static position, in accordance with an embodiment of the invention.

FIG. 4 is a side elevational view of the first gear 110a in a retracted static position within the wheel well 222, in accordance with an embodiment of the invention. Although the discussion that follows describes retraction of the first main gear assembly 110a from the first deployed static position 111a, it is equally applicable to retraction of the second gear 110b (FIG. 3) from the second deployed static position 111b. Referring to FIGS. 4 and 2 together, in one aspect of this embodiment, retraction of the first gear 110a is started when the folding linkage 270 causes the first brace 250 to fold about the hinge point 255. The actuator 260 then retracts, pivoting the main strut 240 forwardly and upwardly about the first location 224. As the main strut 240 pivots toward the wheel well 222, the torsion linkage 280 pivots the wheel truck 112 clockwise about the second strut end 242. As a result, the wheel truck 112 is stowed in an upside-down orientation within the wheel well 222 when the main strut 240 has been fully retracted. In a further aspect of this embodiment, a locking mechanism 424 can be used to lock the first gear 110a in the retracted static position.

One feature of embodiments of the foregoing arrangement is that the same wing 120 can be used with both baseline and stretched fuselage configurations without having to modify the wing 120 to accommodate different CG locations and different main gear assemblies. An advantage of this feature is that the cost of derivative aircraft configurations can be reduced by increasing the number of common components. A further advantage is that the deployed static position of the landing gear can be changed by simply selecting the appropriate brace length.

Figure 5:
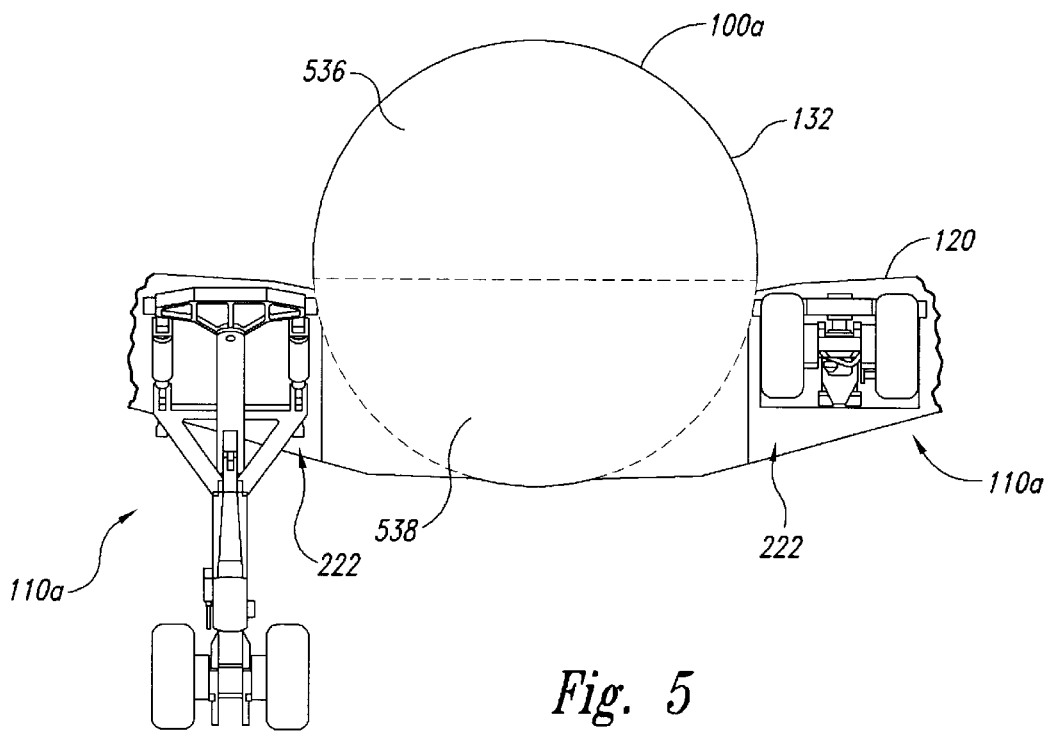
FIG. 5 is a partial cutaway forward cross-sectional elevational view of the first aircraft of FIG. 1A showing a left main gear assembly in a deployed static position and a right main gear assembly in a retracted static position, in accordance with embodiments of the invention taken substantially along line 5—5 in FIG. 1A.

FIG. 5 is a partial cutaway forward cross-sectional elevational view of the first aircraft 100a showing the left first gear 110a in the deployed static position, and the right first gear 110a in the retracted static position, in accordance with embodiments of the invention taken substantially along line 5—5 in FIG. 1A. Although the discussion that follows refers to the first aircraft 100a and the first gear 110a, it is equally applicable to the second aircraft 100b and the second gear 110b. In one aspect of this embodiment, the aft fuselage portion 132 of the first aircraft 100a includes a passenger cabin portion 536 and a cargo hold portion 538. In another aspect of this embodiment, the wheel wells 222 are formed in the underside of the wings 120 outboard of the cargo hold portion 538. Accordingly, a further advantage of the present invention is that the wheel wells 222 do not impinge on or otherwise reduce the volume of the cargo hold portion 538.

Figure 6:
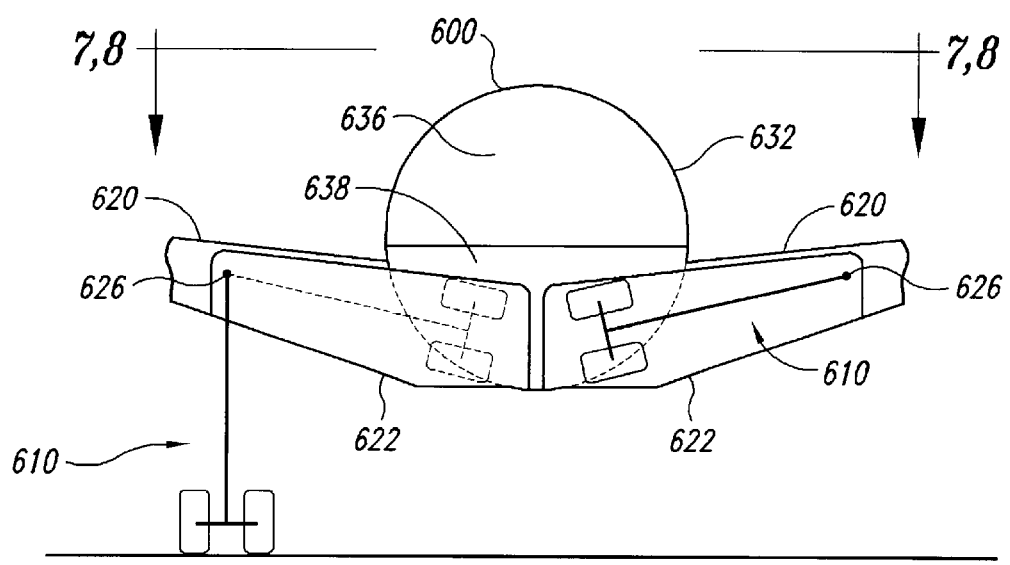
FIG. 6 is a partial cutaway forward cross-sectional elevational view of an aircraft having inwardly retracting main gear assemblies, in accordance with another embodiment of the invention.

FIG. 6 is a partial cutaway forward cross-sectional elevational view of an aircraft 600 having inwardly retracting main gear assemblies 610 in accordance with another embodiment of the invention. In one aspect of this embodiment, the aircraft 600 includes wings 620 fixedly attached to an aft fuselage portion 632. The aft fuselage portion 632 can include a passenger cabin portion 636 and a cargo hold portion 638. In another aspect of this embodiment, wheel wells 622 extend inwardly from the undersides of the wings 620 into the cargo hold portion 638 of the aft fuselage portion 632. Trunnions 626 can be positioned within the wheel wells 622 to provide support for the main gear assemblies 610 ("the gears 610") which pivot inwardly and upwardly about the trunnions 626 for stowage in the wheel wells 622. Accordingly, in contrast to the main gear assemblies described above in reference to FIGS. 1A–5, inwardly retracting main gear assemblies such as the gears 610 may require wheel well configurations that reduce cargo space. In some instances, however, such inwardly retracting main gear assemblies may increase fuel capacity of the wings.

Figure 7:
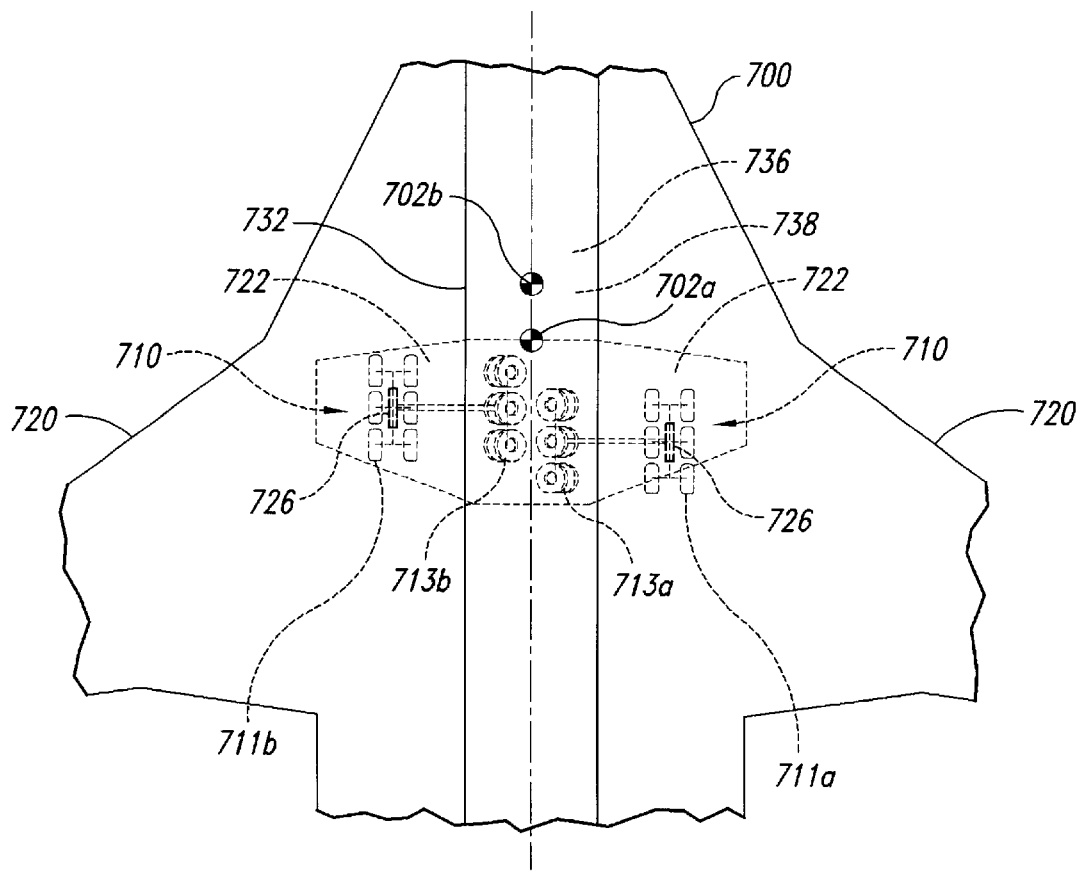
FIG. 7 is a partially hidden top plan view of a portion of an aircraft having main gear assemblies that retract inwardly, similar to the main gear assemblies of FIG. 6, in accordance with an embodiment of the invention.

FIG. 7 is a partially hidden top plan view of a portion of an aircraft 700 having main gear assemblies 710 that retract inwardly, similar to the gears 610 of FIG. 6, in accordance with another embodiment of the invention. In FIG. 7, the main gear assemblies 710 ("the gears 710") are shown in both deployed static positions (identified by reference numbers 711a, 711b) and retracted static positions (identified by reference numbers 713a, 713b) for purposes of illustration. In one aspect of this embodiment, the aircraft 700 includes wings 720 fixedly attached to an aft fuselage portion 732. The aft fuselage portion 732 can include a passenger cabin portion 736 positioned above a cargo hold portion 738. In another aspect of this embodiment, oversize wheel wells 722 extend inwardly from the undersides of the wings 720 into the cargo hold portion 738 of the aft fuselage portion 732. Trunnions 726 can be positioned within the wheel wells 722 to support the gears 710 which pivot inwardly and upwardly about the trunnions 726 for stowage in the oversize wheel wells 722.

In one aspect of this embodiment, the oversize wheel wells 722 are configured to allow the positions of the trunnions 726 to be adjusted fore and aft to accommodate various aircraft CG locations. For example, on the right side of FIG. 7, the trunnions 726 is positioned aft in the wheel well 722 to accommodate a first CG location 702a that may be associated with a baseline version of the aircraft 700. The trunnions 726 shown on the left side of FIG. 7 is positioned forward in the wheel well 722 to accommodate a second CG location 702b forward of the first CG location 702a that may be associated with a stretched version of the aircraft 700. Accordingly, the wing 720 and the gears 710 can be used with both baseline and stretched aircraft configurations without major modification by repositioning the trunnions 726 fore and aft in the wheel wells 722 to accommodate the changing CG positions.

Figure 8:
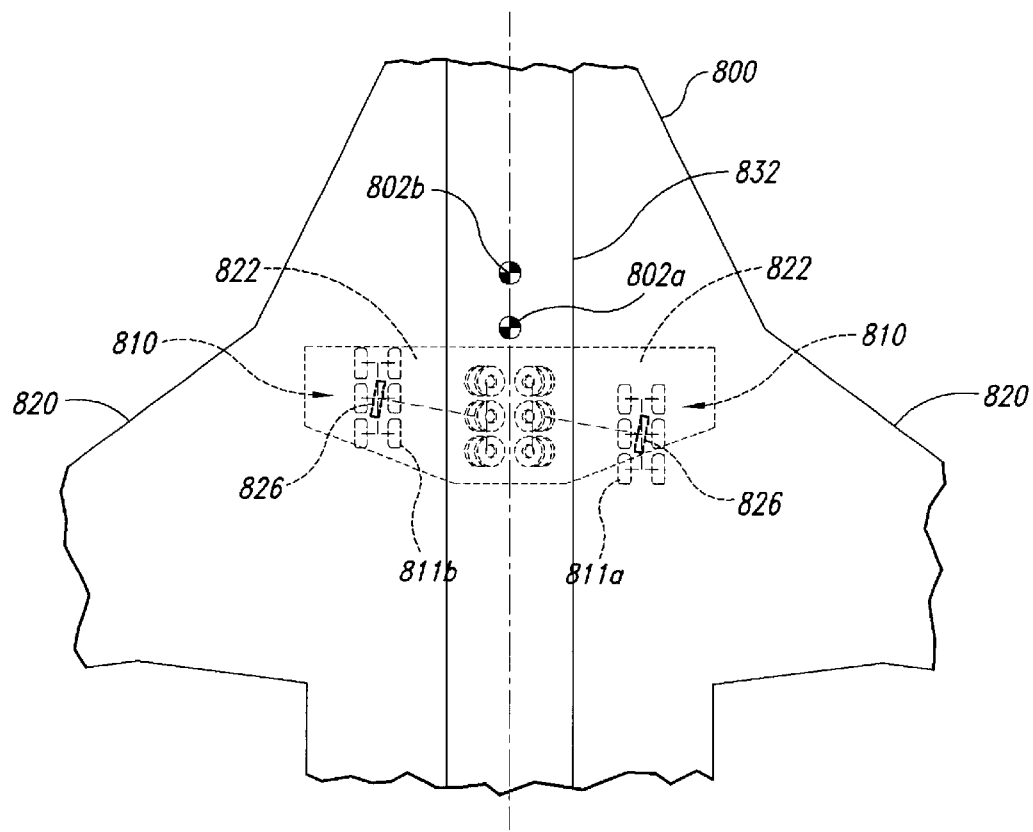
FIG. 8 is a partially hidden top plan view of a portion of another aircraft having main gear assemblies that retract inwardly, similar to the main gear assemblies of FIG. 6, in accordance with another embodiment of the invention.

FIG. 8 is a partially hidden top plan view of a portion of an aircraft 800 having main gear assemblies 810 that retract inwardly, similar to the gears 610 of FIG. 6, in accordance with another embodiment of the invention. In one aspect of this embodiment, the aircraft 800 includes wings 820 and an aft fuselage portion 832 that are at least generally similar to the wings 720 and the aft fuselage portion 732, respectively, of FIG. 7. In another aspect of this embodiment, however, the aircraft 800 includes wheel wells 822 that are smaller than the oversize wheel wells 722 of FIG. 7. Trunnions 826 can be positioned within the wheel wells 822 to support the main landing gear assemblies 810 ("the gears 810") which pivot inwardly and upwardly about the trunnions 826 for stowage in the wheel wells 822.

In one aspect of this embodiment, the trunnions 826 are angularly positionable within the wheel wells 822 to adjust the deployed static positions of the gears 810 to accommodate various aircraft CG locations. For example, on the right side of FIG. 8, the trunnion 826 is angled forward in the wheel well 822, resulting in an aft deployed static position 811a to accommodate a first CG location 802a that may be associated with a baseline version of the aircraft 800. In contrast, the trunnion 826 shown on the left side of FIG. 8 is angled aft in the wheel well 822, resulting in a forward deployed static position 811b to accommodate a second CG location 802b forward of the first CG location that may be associated with a stretched version of the aircraft 800. Accordingly, the wing 820 and the gears 810 can be used with both baseline and stretched fuselage configurations without major modification by adjusting the angle of the trunnion 826 in the wheel wells 822 to accommodate the changing CG positions.

From the foregoing, it will be appreciated that specific embodiments of the invention have been described herein for purposes of illustration, but that various modifications may be made without deviating from the spirit and scope of the invention. For example, although this disclosure has addressed main landing gear configurations, those of ordinary skill in the art will appreciate that the embodiments described are equally applicable to other landing gear configurations. Accordingly, the invention is not limited, except as by the appended claims.

We claim:

1. A landing gear assembly for use with an aircraft wing, the aircraft wing configured for use with a first aircraft having a first CG position and a second aircraft having a second CG position, the landing gear assembly comprising:
    a wheel truck;
    a strut configured to be pivotally connected between the wing and the wheel truck;
    a first brace configured to be pivotally coupled between the wing and the strut to position the wheel truck in a first deployed static position relative to the wing, wherein the wheel truck supports a portion of the weight of the first aircraft when in the first deployed static position; and
    a second brace configured to be pivotally connected between the wing and the strut in place of the first brace to position the wheel truck in a second deployed static position relative to the wing different than the first deployed static position, wherein the wheel truck supports a portion of the weight of the second aircraft when in the second deployed static position.

2. The landing gear assembly of claim 1, wherein the first brace extends between the strut and the wing defining a first brace length when the wheel truck is in the first deployed static position, and wherein the second brace extends between the strut and the wing defining a second brace length less than the first brace length when the wheel truck is in the second deployed static position, the second deployed static position being forward of the first deployed static position.

3. The landing gear assembly of claim 1, wherein the first aircraft configuration has a first CG position relative to the wing and the second aircraft configuration has a second CG position relative to the wing forward of the first CG position, and wherein the second deployed static position of the wheel truck is forward of the first deployed static position of the wheel truck.

4. The landing gear assembly of claim 1, wherein the first deployed static position of the wheel truck is longitudinally offset from the second deployed static position of the wheel truck.

5. The landing gear assembly of claim 1, wherein the first and second braces are foldable drag braces.

6. The landing gear assembly of claim 1, wherein the first and second braces are interchangeably connectable to the strut at the same location on the strut.

7. The landing gear assembly of claim 1, wherein the first and second braces are interchangeably connectable to the wing at the same location on the wing.

8. The landing gear assembly of claim 1, wherein the first and second braces are interchangeably connectable to the strut at a first location on the strut, and wherein the first and second braces are interchangeably connectable to the wing at a second location on the wing.

9. The landing gear assembly of claim 1, wherein the first and second braces are interchangeably connectable to the wing at a first location on the wing, and wherein the strut is configured to be pivotally connected to the wing at a second location on the wing aft of the first location.

10. The landing gear assembly of claim 1, wherein the first brace extends between the strut and the wing defining a first brace length when the wheel truck is in the first deployed static position, and wherein the second brace extends between the strut and the wing defining a second brace length different than the first brace length when the wheel truck is in the second deployed static position.

11. The landing gear assembly of claim 1, wherein the first aircraft configuration has a first fuselage length and the second aircraft configuration has a second fuselage length greater than the first fuselage length, wherein the second deployed static position of the wheel truck is forward of the first deployed static position of the wheel truck.

12. The landing gear assembly of claim 1, wherein the strut is configured to pivot forwardly and upwardly relative to the wing to move the wheel truck from at least the first deployed static position to a retracted static position at least proximate to the wing.

13. The landing gear assembly of claim 1, wherein the strut is configured to pivot forwardly and upwardly relative to the wing to move the wheel truck from at least the first deployed static position to a retracted static position at least proximate to the wing, and wherein the wheel truck is oriented upside down in the retracted static position.

14. The landing gear assembly of claim 1, wherein the wheel truck includes six landing wheels.

15. The landing gear assembly of claim 1, further comprising an actuator configured to move the strut between at least the first deployed static position and a retracted static position, the retracted static position being at least proximate to the wing.

16. The landing gear assembly of claim 1, wherein the strut is configured to be pivotally connected to the wing at a pivot point, and wherein the landing gear assembly further comprises an actuator configured to pivot the strut forwardly and upwardly about the pivot point between at least the first deployed static position and a retracted static position, the retracted static position being at least proximate to the wing.

17. A landing gear assembly for use with an aircraft wing, the landing gear assembly comprising:
 a wheel truck;
 a strut configured to be pivotally connected between the wing and the wheel truck;
 a first brace configured to be connected between the strut and the wing to position the wheel truck in a first weight bearing position relative to the wing; and
 a second brace configured to be connected between the strut and the wing to position the wheel truck in a second weight bearing position relative to the wing different than the first weight bearing position, wherein the strut is further configured to pivot forwardly and upwardly relative to the wing to move the wheel truck from at least the first weight bearing position to a retracted static position at least proximate to the wing.

18. The landing gear assembly of claim 17, wherein the first weight bearing position of the wheel truck is longitudinally offset from the second weight bearing position of the wheel truck.

19. The landing gear assembly of claim 17, wherein the strut is configured to be pivotally connected to the first and second braces, the first and second braces being foldable drag braces.

20. The landing gear assembly of claim 17, wherein the strut is configured to be pivotally connected to the first and second braces, the first and second braces being interchangeably connectable to the strut at a first location on the strut, the first and second braces being interchangeably connectable to the wing at a second location on the wing.

21. The landing gear assembly of claim 17, wherein the strut is configured to be pivotally connected to the wing at a first location, and wherein the first and second braces are interchangeably connectable to the wing at a second location forward of the first location.

22. The landing gear assembly of claim 17, wherein the first brace extends between the strut and the wing defining a first brace length when the wheel truck is in the first weight bearing position, and wherein the second brace extends between the strut and the wing defining a second brace length different than the first brace length when the wheel truck is in the second weight bearing position.

23. The landing gear assembly of claim 17, wherein the first brace extends between the strut and the wing defining a first brace length when the wheel truck is in the first weight bearing position, and wherein the second brace extends between the strut and the wing defining a second brace length less than the first brace length when the wheel truck is in the second weight bearing position, the second weight bearing position being forward of the first weight bearing position.

24. The landing gear assembly of claim 17, wherein the aircraft wing is configured for use with a first aircraft configuration and a second aircraft configuration, the first aircraft configuration having a first CG position relative to the wing and the second aircraft configuration having a second CG position relative to the wing forward of the first CG position, wherein the second weight bearing position of the wheel truck is forward of the first weight bearing position of the wheel truck.

25. The landing gear assembly of claim 17, wherein the aircraft wing is configured for use with a first aircraft configuration and a second aircraft configuration, the first aircraft configuration having a first fuselage length and the second aircraft configuration having a second fuselage length greater than the first fuselage length, wherein the second weight bearing position of the wheel truck is forward of the first weight bearing position of the wheel truck.

26. A landing gear assembly for use with an aircraft wing, the aircraft wing configured for use with a first aircraft configuration and a second aircraft configuration, the landing gear assembly comprising:
 a wheel truck;
 a strut configured to be pivotally connected between the wing and the wheel truck;
 a first member configured to position the wheel truck in a first deployed static position relative to the wing when the wing is used with the first aircraft configuration; and
 a second member configured to position the wheel truck in a second deployed static position relative to the wing different than the first deployed static position when the wing is used with the second aircraft configuration, wherein the strut is further configured to pivot upwardly relative to the wing to move the wheel truck from at least the first deployed static position to a retracted static position at least proximate to the wing.

27. The landing gear assembly of claim 26, wherein the wing includes a trunnion having a first trunnion position relative to the wing and a second trunnion position relative to the wing different than the first trunnion position, wherein the strut is configured to be pivotally connected to the trunnion and position the wheel truck in the first deployed static position when the trunnion is in the first trunnion position, and wherein the strut is configured to be pivotally connected to the trunnion and position the wheel truck in the second deployed static position when the trunnion is in the second trunnion position.

28. The landing gear assembly of claim 27, wherein the first trunnion position is longitudinally offset from the second trunnion position.

29. The landing gear assembly of claim 27, wherein the first trunnion position is longitudinally aft of the second trunnion position.

30. The landing gear assembly of claim 27, wherein the first trunnion position is longitudinally aligned with the second trunnion position, and wherein the first trunnion position is aft of the second trunnion position.

31. The landing gear assembly of claim 27, wherein the first trunnion position is angularly offset from the second trunnion position.

32. The landing gear assembly of claim 26, wherein the first aircraft configuration has a first CG position relative to the wing and the second aircraft configuration has a second CG position relative to the wing forward of the first CG position, wherein the strut is configured to support a portion of the weight of the first aircraft configuration when the wheel truck is in the first deployed static position, and wherein the strut is configured to support a portion of the weight of the second aircraft configuration when the wheel truck is in the second deployed static position forward of the first deployed static position.

33. The landing gear assembly of claim 26, wherein the first aircraft configuration has a first fuselage length and the second aircraft configuration has a second fuselage length greater than the first fuselage length, wherein the second deployed static position of the wheel truck is forward of the first deployed static position of the wheel truck.

34. The landing gear assembly of claim 26, wherein the first deployed static position of the wheel truck is longitudinally offset from the second deployed static position of the wheel truck.

35. The landing gear assembly of claim 26, wherein the strut is configured to be connected to a first brace extending between the strut and the wing to position the wheel truck in the first deployed static position, and wherein the strut is further configured to be connected to a second brace extending between the strut and the wing to position the wheel truck in the second deployed static position.

36. An aircraft wing for use with a first aircraft configuration and a second aircraft configuration, the aircraft wing comprising:
   at least a portion of a wheel well;
   a trunnion positioned at least proximate to the wheel well; and
   a landing gear assembly, the landing gear assembly including:
      a wheel truck configured to be received by the wheel well;
      a strut pivotally connected between the trunnion and the wheel truck;
      a first brace configured to extend between the strut and the wheel well for positioning the wheel truck in a first deployed static position relative to the wing when used with the first aircraft configuration; and
      a second brace configured to extend between the strut and the wheel well for positioning the wheel truck in a second deployed static position relative to the wing different than the first deployed static position when used with the second aircraft configuration.

37. The aircraft wing of claim 36, wherein the strut is configured to pivot forwardly and upwardly relative to the trunnion to move the wheel truck from at least the first deployed static position to a retracted static position at least proximate to the wheel well, and wherein the wheel truck is orientated upside down in the retracted static position.

38. The aircraft wing of claim 36, wherein the landing gear assembly further comprises an actuator configured to pivot the strut forwardly and upwardly about the trunnion between at least the first deployed static position and a retracted static position, the retracted static position being at least proximate to the wheel well.

39. The aircraft wing of claim 36, wherein the first and second braces are interchangeably connectable to the strut at the same location on the strut.

40. The aircraft wing of claim 36, wherein the first deployed static position of the wheel truck is longitudinally offset from the second deployed static position of the wheel truck.

41. The aircraft wing of claim 36, wherein the second deployed static position of the wheel truck relative to the wing is forward of the first deployed static position of the wheel truck relative to the wing.

42. A first aircraft and a second aircraft, the first and second aircraft comprising:
   a first wing;
   a first wheel truck;
   a first strut configured to be pivotally connected between the first wing and the first wheel truck;
   a first brace configured to position the first wheel truck in a first deployed static position relative to the first wing to support at least a portion of the weight of the first aircraft;
   a second wing;
   a second wheel truck;
   a second strut, wherein the second strut is at least generally similar to the first strut and is configured to be pivotally connected between the second wing and the second wheel truck; and
   a second brace configured to position the second wheel truck in a second deployed static position relative to the second wing to support at least a portion of the weight of the second aircraft, wherein the second deployed static position relative to the second wing is different than the first deployed static position relative to the first wing.

43. The first and second aircraft of claim 42, further comprising:
   a first fuselage having a first length, wherein the first wing is fixedly attached to the first fuselage; and
   a second fuselage having a second length longer than the first length, wherein the second wing is fixedly attached to the second fuselage, and wherein the second deployed static position of the second wheel truck relative to the second wing is forward of the first deployed static position of the first wheel truck relative to the first wing.

44. The first and second aircraft of claim 42, wherein the second wing is at least generally similar to the first wing.

45. The first and second aircraft of claim 42, wherein the second wheel truck is at least generally similar to the first wheel truck.

46. The first and second aircraft of claim 42, wherein the second wing is at least generally similar to the first wing, and wherein the second wheel truck is at least generally similar to the first wheel truck.

47. A landing gear assembly for use with an aircraft wing, the aircraft wing configured for use with a first aircraft configuration and a second aircraft configuration, the landing gear assembly comprising: roller means for moveably supporting at least a portion of the weight of the first aircraft configuration and the second aircraft configuration;
means for deploying the roller means;
first positioning means having first brace configured to position the roller means in a first deployed static position relative to the wing when the wing is used with the first aircraft configuration; and
second positioning means having second brace configured to position the roller means in a second deployed static position relative to the wing different than the first deployed static position relative to the wing when the wing is used with the second aircraft configuration.

48. The landing gear assembly of claim 47, wherein the first aircraft configuration has a first CG position relative to the wing and the second aircraft configuration has a second CG position relative to the wing forward of the first CG position, wherein the second deployed static position of the roller means relative to the wing is forward of the first deployed static position of the roller means relative to the wing.

49. The landing gear assembly of claim 47, wherein the first aircraft configuration has a first fuselage length and the second aircraft configuration has a second fuselage length greater than the first fuselage length, wherein the second deployed static position of the roller means relative to the wing is forward of the first deployed static position of the roller means relative to the wing.

50. The landing gear assembly of claim 47, wherein the first deployed static position of the roller means is longitudinally offset from the second deployed static position of the roller means.

51. The landing gear assembly of claim 47, wherein the means for deploying the roller means includes a strut configured to be pivotally connected between the wing and the roller means, wherein the strut is configured to be connected to the first brace extending between the strut and the wing to position the roller means in the first deployed static position, and wherein the strut is configured to be connected to the second brace extending between the strut and the wing to position the roller means in the second deployed static position.

52. A method for manufacturing a second aircraft configuration derived from a first aircraft configuration, the first aircraft configuration having a first fuselage with a first length, a first wing fixedly attached to the first fuselage and having a first pivot location, and a first landing gear assembly pivotally connected to the first wing at the first pivot location, the first landing gear assembly including a first brace configured to position a first wheel truck in a first deployed static position relative to the first wing to support a portion of the weight of the first aircraft configuration, the method for manufacturing the second aircraft comprising:
providing a second fuselage having a second length different than the first length;
providing a second wing, the second wing being at least generally similar to the first wing and having a second pivot location at least generally similar to the first pivot location on the first wing;
fixedly attaching the second wing to the second fuselage;
providing a second landing gear assembly, the second landing gear assembly including a second brace configured to position a second wheel truck in a second deployed static position relative to the second wing to support a portion of the weight of the second aircraft configuration, the second deployed static position of the second wheel truck relative to the second wing being different than the first deployed static position of the first wheel truck relative to the first wing; and
pivotally connecting the second landing gear assembly to the second wing at the second pivot location.

53. The method of claim 52, wherein providing the second fuselage includes extending the second fuselage length beyond the first fuselage length.

54. The method of claim 52, wherein providing the second landing gear assembly includes longitudinally offsetting the second deployed static position of the second wheel truck relative to the first deployed static position of the first wheel truck.

55. The method of claim 52, wherein the first aircraft configuration has a first CG location and the second aircraft configuration has a second CG location offset from the first CG location in an offset direction, and wherein providing the second landing gear assembly includes offsetting the second deployed static position of the second wheel truck in the offset direction relative to the first deployed static position of the first wheel truck.

56. The method of claim 52, wherein the first landing gear assembly is configured to pivot the first wheel truck about the first pivot location between the first deployed static position and a first retracted static position, and wherein providing the second landing gear assembly includes configuring the second landing gear assembly to pivot the second wheel truck about the second pivot location between the second deployed static position and a second retracted static position, the second retracted static position being at least generally similar to the first retracted static position.

57. The method of claim 52, wherein the first landing gear assembly is configured to pivot the first wheel truck forwardly and upwardly about the first pivot location between the first deployed static position and a first retracted static position, and wherein providing the second landing gear assembly includes configuring the second landing gear assembly to pivot the second wheel truck forwardly and upwardly about the second pivot location between the second deployed static position and a second retracted static position, the second retracted static position being at least generally similar to the first retracted static position.

58. A method for manufacturing a second aircraft configuration derived from a first aircraft configuration, the first aircraft configuration having a first CG location and the second aircraft configuration having a second CG location different than the first CG location, the first aircraft configuration further having a first wing and a first landing gear assembly, the first wing having a first pivot location and the first landing gear assembly being pivotally connected to the first wing at the first pivot location, the first landing gear assembly including a first brace configured to position a first wheel truck in a first deployed static position relative to the first wing to support a portion of the weight of the first aircraft configuration, the method for manufacturing the second aircraft comprising:

providing a second wing, the second wing being at least generally similar to the first wing and having a second pivot location;

providing a second landing gear assembly, the second landing gear assembly including a second brace configured to position a second wheel truck in a second deployed static position relative to the second wing to support a portion of the weight of the second aircraft configuration, the second deployed static position of the second wheel truck relative to the second wing being different than the first deployed static position of the first wheel truck relative to the first wing; and pivotally connecting the second landing gear assembly to the second wing at the second pivot location, the second landing gear assembly being configured to pivot upwardly about the second pivot location to stow the second landing gear assembly in a static retracted position.

59. The method of claim 58, wherein providing the second wing includes positioning the second pivot location at least generally similar to the first pivot location on the first wing.

60. The method of claim 58, wherein providing the second wing includes longitudinally offsetting the second pivot location on the second wing relative to the first pivot location on the first wing.

61. The method of claim 58, wherein the second CG location is forward of the first CG location, and wherein providing the second wing includes positioning the second pivot location on the second wing forward relative to the first pivot location on the first wing.

62. The method of claim 58, wherein providing the second wing includes axially aligning the second pivot location on the second wing relative to the first pivot location on the first wing.

63. The method of claim 58, wherein providing the second wing includes angularly offsetting the second pivot location on the second wing relative to the first pivot location on the first wing.

64. The method of claim 58, wherein providing the second landing gear assembly includes longitudinally offsetting the second deployed static position of the second wheel truck relative to the first deployed static position of the first wheel truck.

65. The method of claim 58, wherein the first landing gear assembly is configured to pivot the first wheel truck about the first pivot location between the first deployed static position and a first retracted static position, and wherein providing the second landing gear assembly includes configuring the second landing gear assembly to pivot the second wheel truck about the second pivot location between the second deployed static position and a second retracted static position, the second retracted static position, being at least generally similar to the first retracted static position.

66. A method for manufacturing a second aircraft configuration derived from a first aircraft configuration, the first aircraft configuration having a first fuselage with a first fuselage forward portion and a first fuselage aft portion, the first aircraft configuration further having a first wing and a first landing gear assembly, the first wing being fixedly attached to the first fuselage aft portion and having a first pivot location, the first landing gear assembly being pivotally connected to the first wing at the first pivot location, the first landing gear assembly including a first brace configured to position a first wheel truck in a first deployed static position offset from the first wing to support a portion of the weight of the first aircraft configuration, the method for manufacturing the second aircraft configuration comprising:

providing a second fuselage forward portion, the second fuselage forward portion being at least generally similar to the first fuselage forward portion;

providing a second fuselage aft portion, the second fuselage aft portion being at least generally similar to the first fuselage aft portion;

providing a fuselage extension;

attaching the fuselage extension to the second fuselage forward portion and the second fuselage aft portion;

providing a second wing, the second wing being at least generally similar to the first wing and having a second pivot location;

attaching the second wing to the second fuselage aft portion;

providing a second landing gear assembly, the second landing gear assembly including a second brace configured to position a second wheel truck in a second deployed static position offset from the second wing to support a portion of the weight of the second aircraft configuration; and pivotally connecting the second landing gear assembly to the second wing at the second pivot location.

67. The method of claim 66, wherein the first aircraft configuration has a first CG location and the second aircraft configuration has a second CG location offset from the first CG location in an offset direction, and wherein providing the second landing gear assembly includes offsetting the second deployed static position of the second wheel truck in the offset direction relative to the first deployed static position of the first wheel truck.

68. The method of claim 66, wherein the first landing gear assembly is configured to pivot the first wheel truck forwardly and upwardly about the first pivot location between the first deployed static position and a first retracted static position, and wherein providing the second landing gear assembly includes configuring the second landing gear assembly to pivot the second wheel truck forwardly and upwardly about the second pivot location between the second deployed static position and a second retracted static position.

* * * * *